United States Patent
Raabe et al.

(10) Patent No.: US 10,267,396 B2
(45) Date of Patent: Apr. 23, 2019

(54) ATTITUDE CONTROL DEVICE

(71) Applicants: The University of Tokyo, Tokyo (JP); BLUE INNOVATION Co., Ltd., Tokyo (JP)

(72) Inventors: Christopher Thomas Raabe, Tokyo (JP); Shinji Suzuki, Tokyo (JP); Takeshi Tsuchiya, Tokyo (JP); Takayuki Kumada, Tokyo (JP); Makoto Shibasaki, Tokyo (JP)

(73) Assignees: The University of Tokyo, Tokyo (JP); Blue Innovation Co., Ltd., Tokyo (JP)

( * ) Notice: Subject to any disclaimer, the term of this patent is extended or adjusted under 35 U.S.C. 154(b) by 0 days.

(21) Appl. No.: 15/580,513

(22) PCT Filed: Jun. 8, 2016

(86) PCT No.: PCT/JP2016/067123
§ 371 (c)(1),
(2) Date: Dec. 7, 2017

(87) PCT Pub. No.: WO2016/199826
PCT Pub. Date: Dec. 15, 2016

(65) Prior Publication Data
US 2018/0163832 A1 Jun. 14, 2018

(30) Foreign Application Priority Data
Jun. 9, 2015 (JP) .................................. 2015-117041

(51) Int. Cl.
*F16H 37/06* (2006.01)
*B64C 17/06* (2006.01)
(Continued)

(52) U.S. Cl.
CPC ............. *F16H 37/06* (2013.01); *B23Q 3/157* (2013.01); *B25J 5/00* (2013.01); *B25J 9/104* (2013.01);
(Continued)

(58) Field of Classification Search
CPC ....... B23Q 3/157; B25J 17/00; B25J 17/0275; B25J 5/00; B25J 9/104; B64C 17/06; F16H 21/46; F16H 37/06
See application file for complete search history.

(56) References Cited

U.S. PATENT DOCUMENTS 5,132,601 A 7/1992 Ohtani
2007/0299427 A1* 12/2007 Yeung ...................... B25J 9/047
606/1

(Continued)

FOREIGN PATENT DOCUMENTS

JP 58-206391 A 12/1983
JP 02-218583 A 8/1990
(Continued)

OTHER PUBLICATIONS

International Search Report and Written Opinion, International Patent Application No. PCT/JP2016/067123, dated Sep. 6, 2016, with English translation of Search Report (8 pages).

*Primary Examiner* — Muhammad S Islam
(74) *Attorney, Agent, or Firm* — Hamre, Schumann, Mueller & Larson, P.C.

(57) ABSTRACT

A heavy-weight object such as a motor is installed separately from a movable portion to reduce the weight of the movable portion. The invention includes a support unit, a movable unit to which equipment is attached, and a drive unit interposed between the support unit and the movable unit. The movable unit has a first rotating member rotatably (Continued)

attached to the support unit about a first rotation axis line and a second rotating member rotatably attached to the first rotating member about a second rotation axis line orthogonal to the first rotation axis line. The support unit is provided with paired first brackets positioned so as to sandwich the first rotating member, and these first brackets are each provided with a first shaft configuring the first rotation axis line. The second rotating member is provided with paired second brackets positioned so as to sandwich the first rotating member from a direction orthogonal to the paired first brackets, and the second brackets are each provided with a second shaft configuring the second rotation axis line and causing the first rotating member to rotatably support the second rotating member. The drive unit includes paired motors attached to the support unit and having a rotation axis line parallel to each of the first shafts, an endless belt wound between a pulley and each of the motors, and paired gears respectively attached to the first shaft and the second shaft adjacent to each other as a set and converting rotation about the first rotation axis line into rotation about the second rotation axis line. One of the gears is fastened to the pulley and is rotatably attached to the first rotating member, the other gear is fastened to the second bracket of the second rotating member, and to the first shaft to which the gear is not attached, the pulley provided to this first shaft and the first rotating member are fastened.

7 Claims, 12 Drawing Sheets

(51) Int. Cl.
*G03B 15/00* (2006.01)
*G03B 17/00* (2006.01)
*G03B 17/56* (2006.01)
*H04N 5/222* (2006.01)
*B23Q 3/157* (2006.01)
*B25J 17/00* (2006.01)
*F16H 21/46* (2006.01)
*B25J 5/00* (2006.01)
*B25J 9/10* (2006.01)
*B25J 17/02* (2006.01)

(52) U.S. Cl.
CPC .......... *B25J 17/00* (2013.01); *B25J 17/0275* (2013.01); *B64C 17/06* (2013.01); *F16H 21/46* (2013.01); *G03B 15/00* (2013.01); *G03B 17/00* (2013.01); *G03B 17/56* (2013.01); *G03B 17/561* (2013.01); *H04N 5/222* (2013.01)

(56) References Cited

U.S. PATENT DOCUMENTS

| | | | |
|---|---|---|---|
| 2012/0089254 A1* | 4/2012 | Shafer | ............... B25J 13/088 700/258 |
| 2014/0020507 A1 | 1/2014 | Sasaki et al. | |
| 2014/0026705 A1 | 1/2014 | Sasaki et al. | |

FOREIGN PATENT DOCUMENTS

| | | |
|---|---|---|
| JP | 08-159381 A | 6/1996 |
| JP | 2006-264567 A | 5/2006 |
| JP | 2008-044089 A | 2/2008 |
| WO | 2012/133801 A1 | 10/2012 |

* cited by examiner

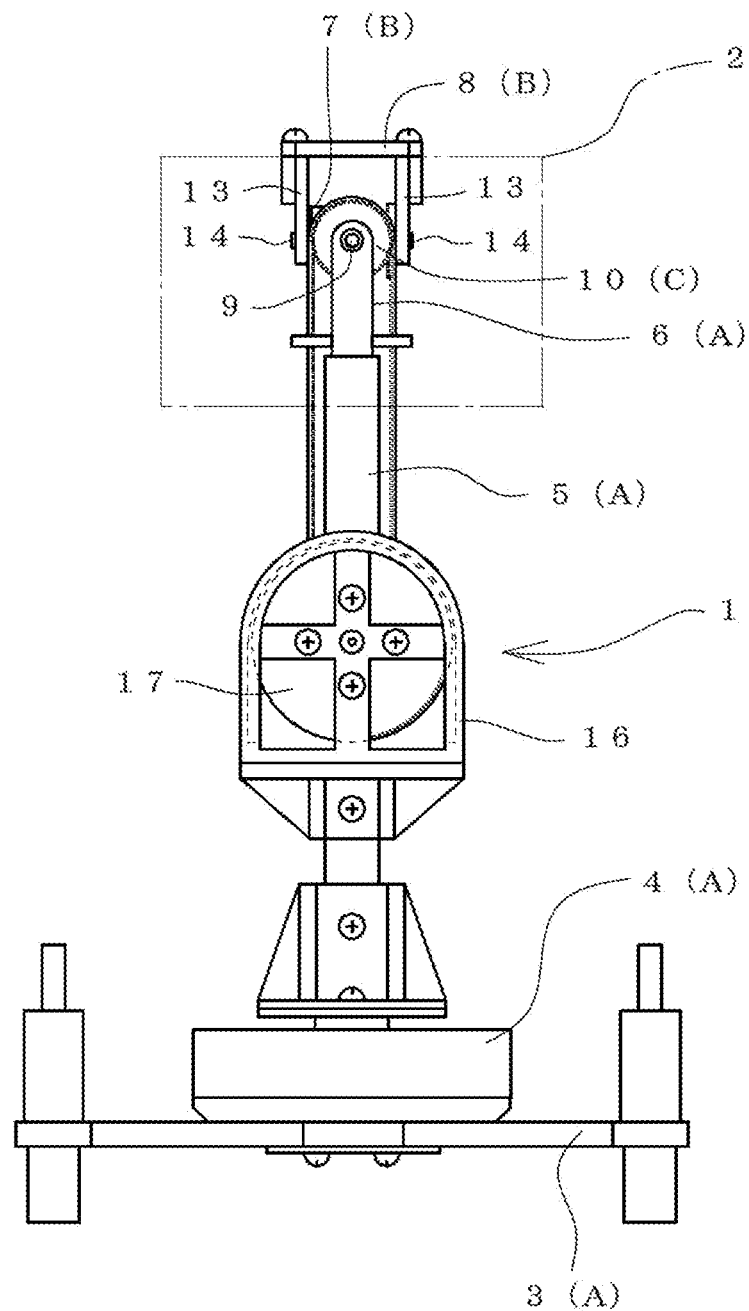
[FIG. 1]

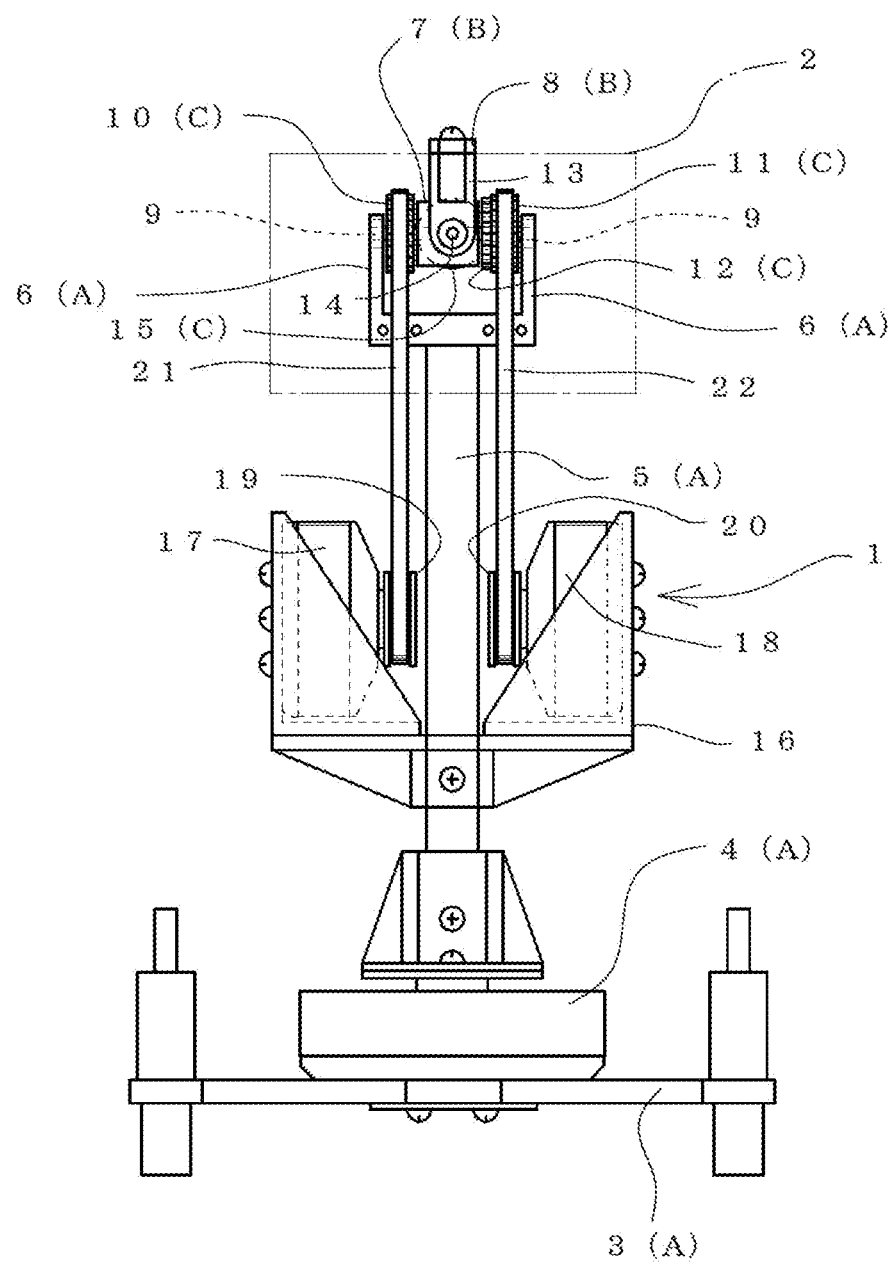
[FIG. 2]

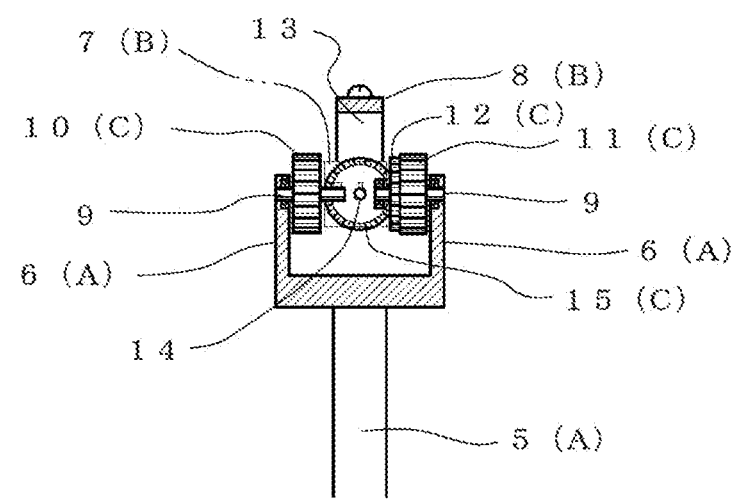
[FIG. 3]

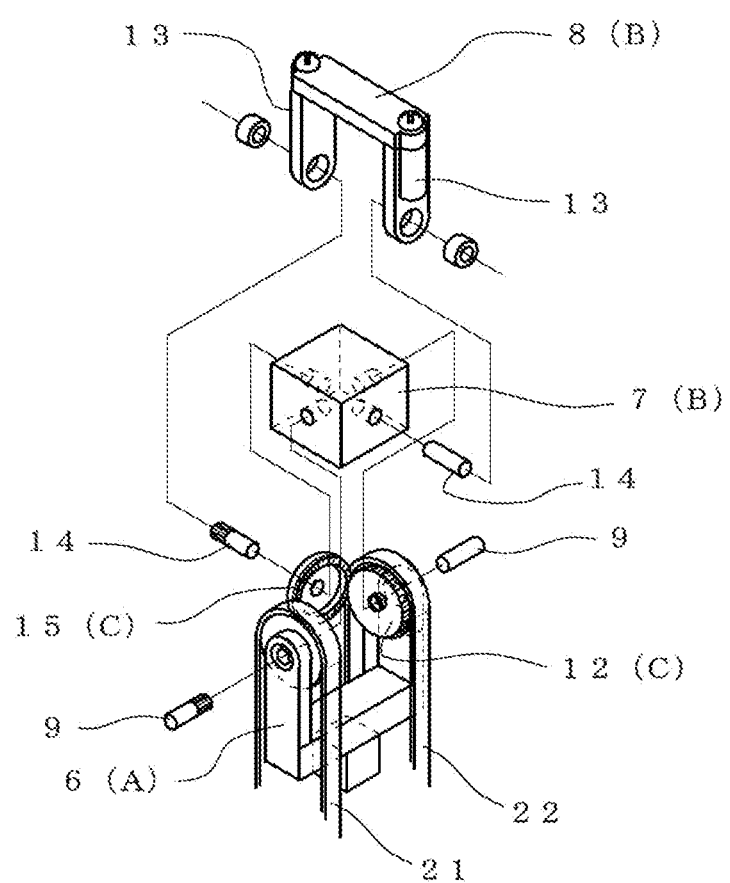
[FIG. 4]

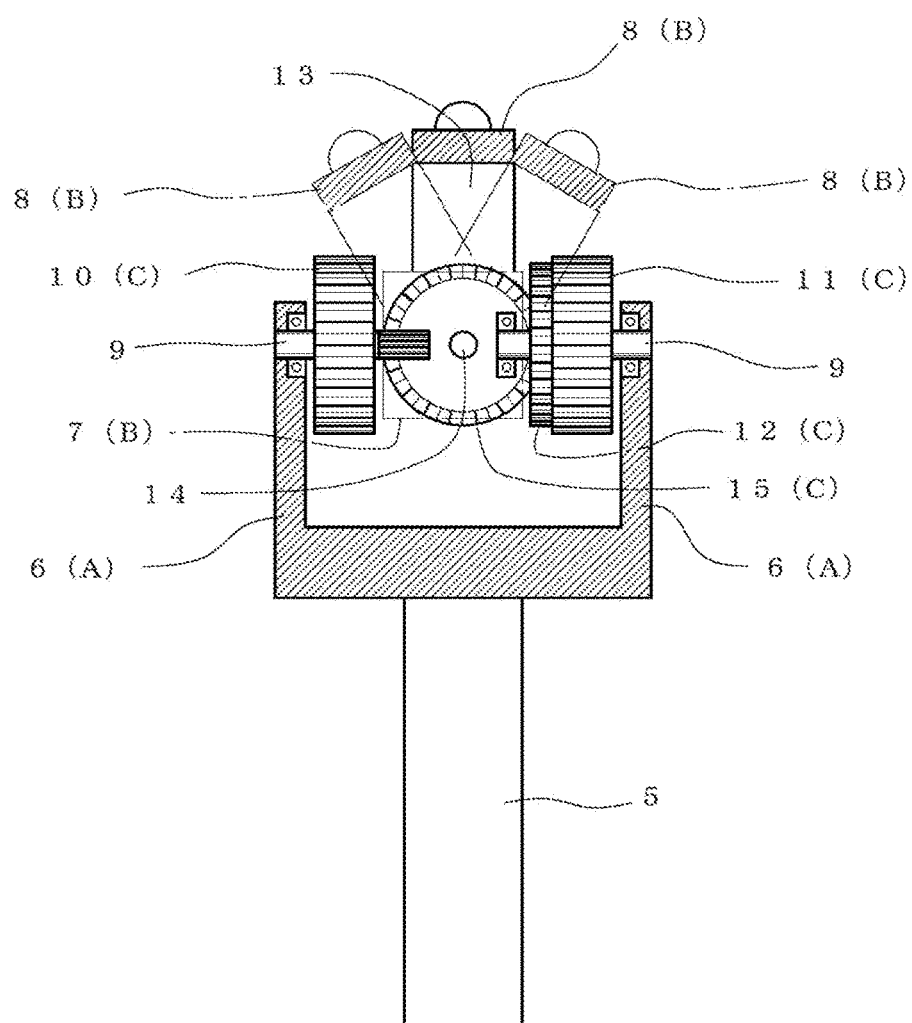
[FIG. 5]

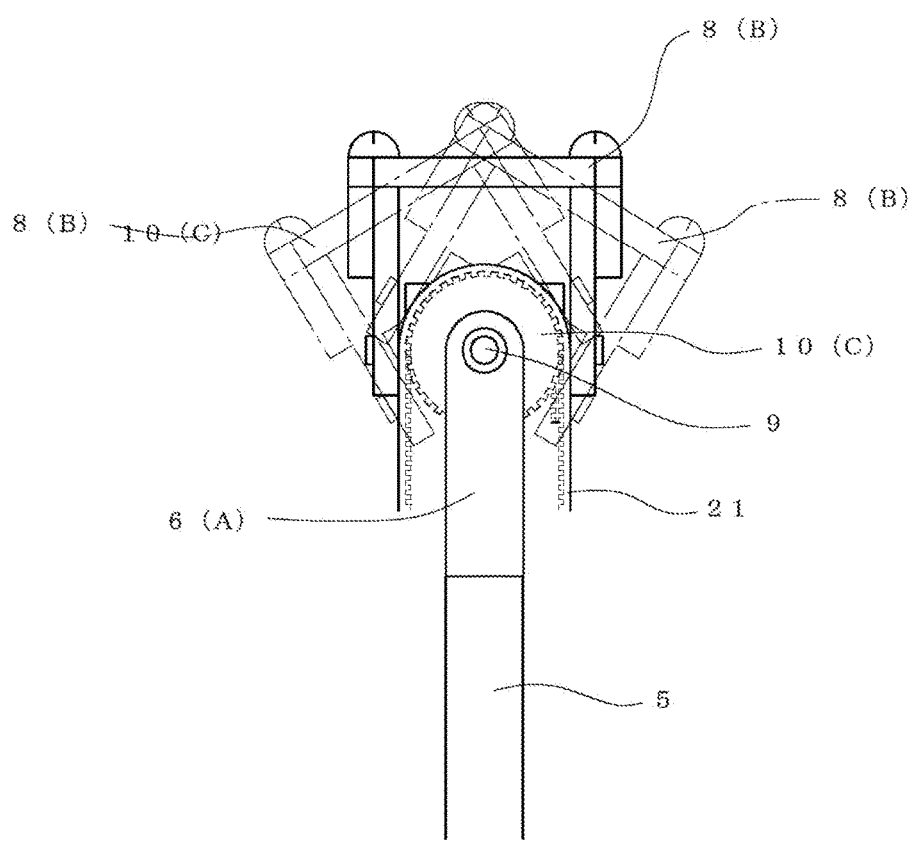
[FIG. 6]

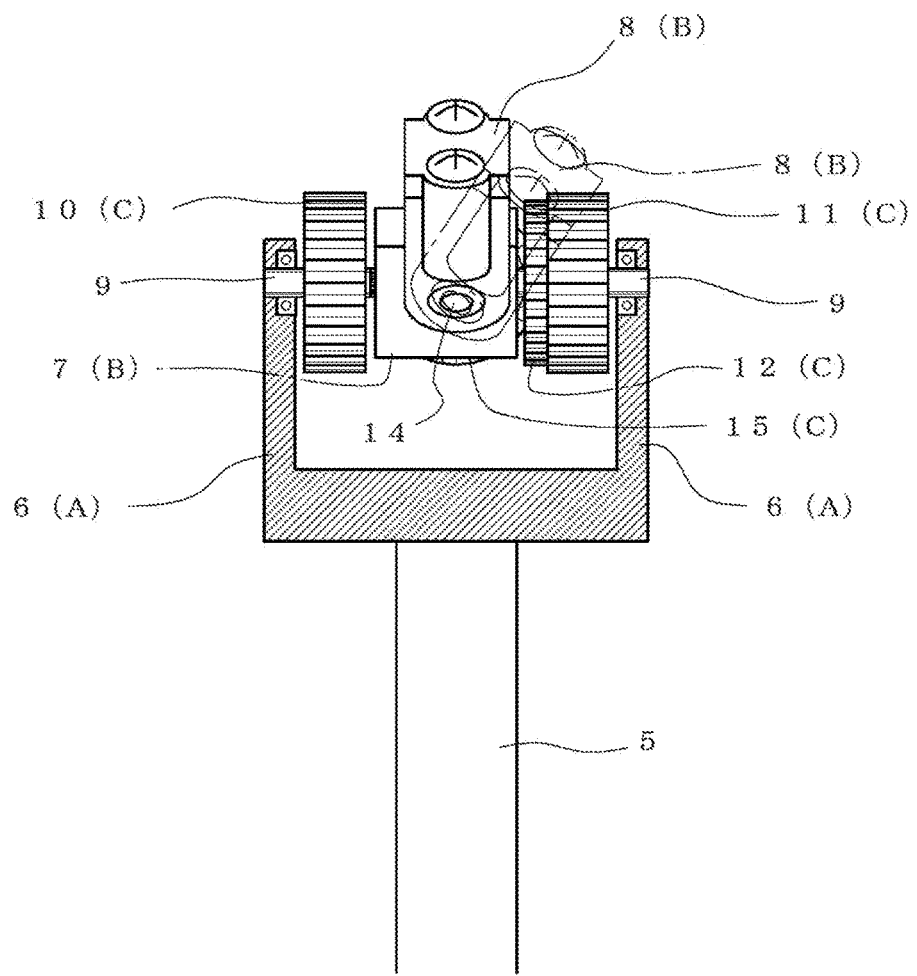
[FIG. 7]

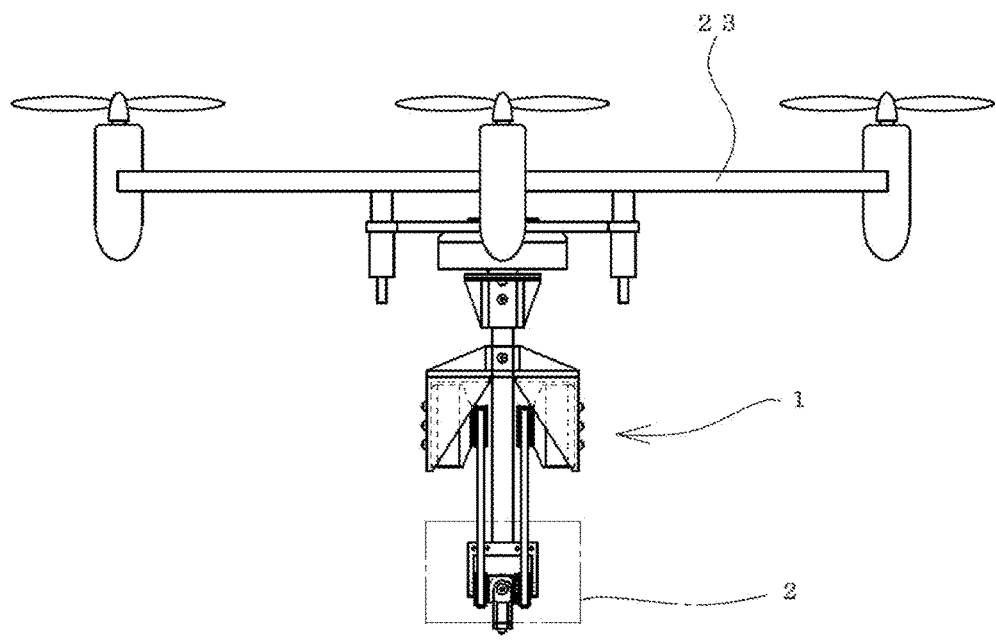
[FIG. 8]

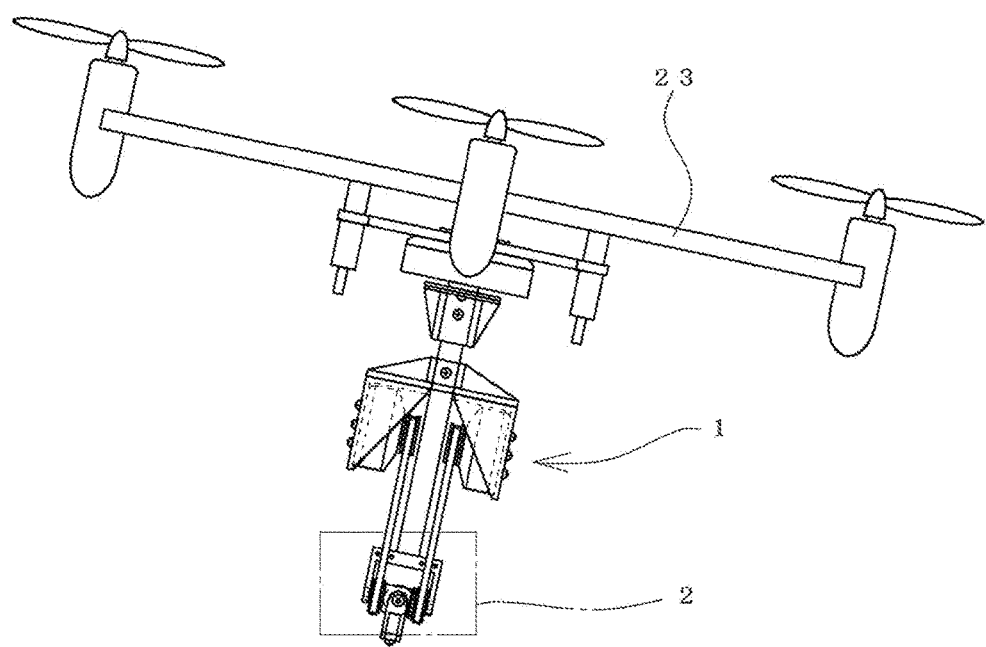
[FIG. 9]

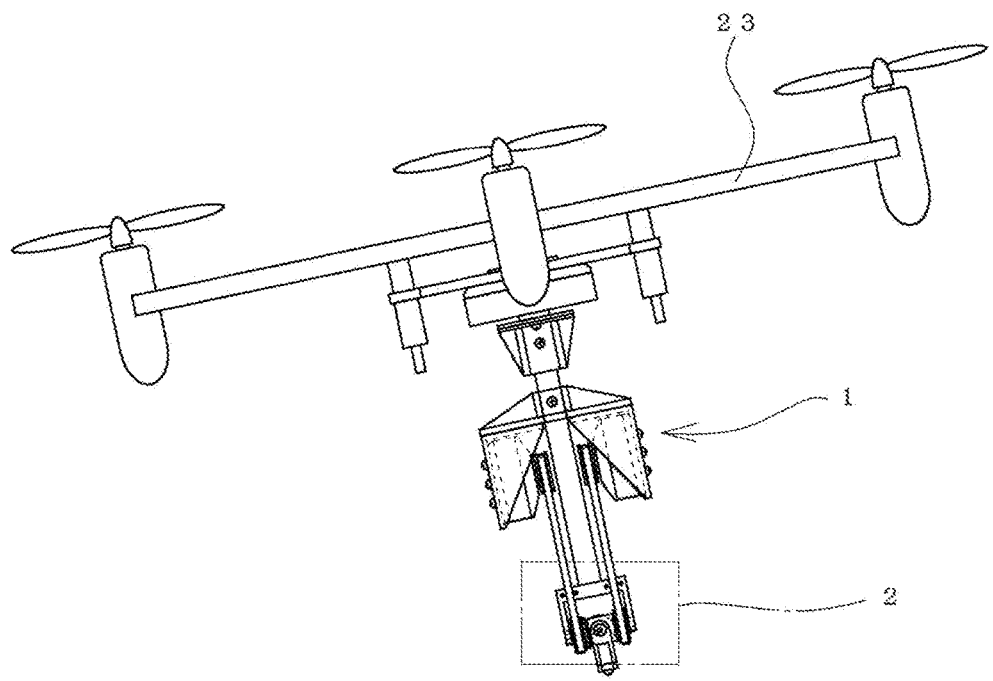
[FIG. 10]

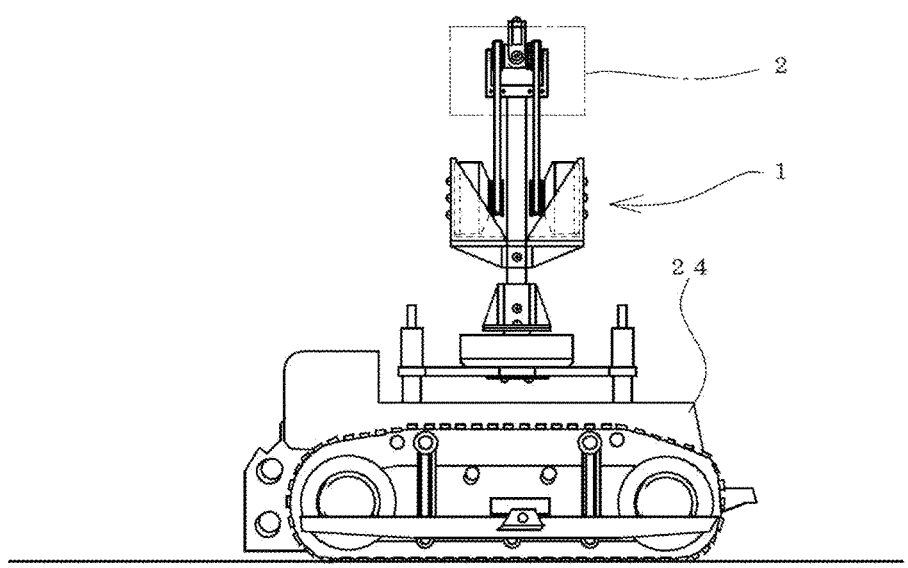
[FIG. 11]

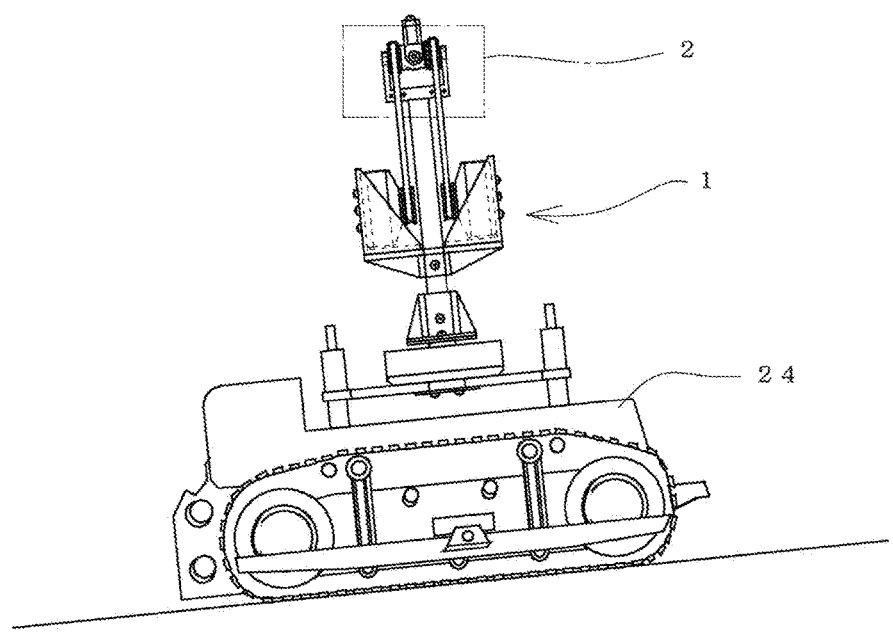
[FIG. 12]

ATTITUDE CONTROL DEVICE

TECHNICAL FIELD

The present invention relates to attitude control devices and, in particular, an attitude control device suitably for use in attitude control of equipment such as imaging equipment or measuring equipment.

BACKGROUND ART

In the above-mentioned imaging equipment, measuring equipment, or the like, its attitude is adjusted to retain an optimum imaging range or measuring range.

For this attitude control, generally, a base where equipment is mounted is supported by a biaxial-drive-type or triaxial-drive-type free joint, and each drive shaft is individually rotated to adjust the tilt of the base, thereby controlling the attitude of the equipment.

As this triaxial-drive-type free joint, for example, a technique described in PTL 1 is suggested.

CITATION LIST

Patent Literature

PTL 1: Japanese Patent Application Laid-Open No. 2008-44089

SUMMARY OF INVENTION

Technical Problem

Meanwhile, in the above-described conventional technology, a motor such as a servo motor is directly coupled to each of the drive shafts, and each of the drive shafts is rotated by this motor.

In this structure, each motor and the drive shaft are integrated, and thus the weight of a movable portion is increased. Accordingly, motive power required for each of the motors is increased, and also a trouble such as a responsivity decrease is assumed.

The present invention was made in view of these problems left in the conventional technology, and a problem to be solved is to provide an attitude control device capable of achieving a weight reduction of a movable portion by installing a heavy-weight object such as a motor separately from the movable portion.

Solution to Problem

To solve the above problem, the invention includes a support unit, a movable unit provided to be connected to this support unit and to which equipment is attached, and a drive unit interposed between these support unit and movable unit, wherein the movable unit has a first rotating member rotatably attached to the support unit about a first rotation axis line and a second rotating member rotatably attached to this first rotating member about a second rotation axis line orthogonal to the first rotation axis line and to which the equipment is attached, the support unit is provided with paired first brackets positioned so as to sandwich the first rotating member, and these first brackets are each provided with a first shaft configuring the first rotation axis line and supporting the first rotating member, the second rotating member is provided with paired second brackets positioned so as to sandwich the first rotating member from a direction orthogonal to the paired first brackets, and these second brackets are each provided with a second shaft configuring the second rotation axis line and causing the first rotating member to rotatably support the second rotating member, the drive unit includes paired motors attached to the support unit and having a rotation axis line parallel to each of the first shafts, an endless belt wound between a pulley provided to each of the first shafts and each of the motors for motive power transmission, and paired gears respectively attached to the first shaft and the second shaft adjacent to each other as a set and converting rotation about the first rotation axis line into rotation about the second rotation axis line, and one of the gears is fastened to the pulley and is rotatably attached to the first rotating member, the other gear is fastened to the second bracket of the second rotating member and, furthermore, to the first shaft to which the gear is not attached, the pulley provided to this first shaft and the first rotating member are fastened.

According to thus configured attitude control device of the present invention, with the paired motors driven to rotate in the same direction at the same angle, the first rotating member can be rotated about the first rotation axis line, in a state in which the rotation of the second rotating member about the second rotation axis line is inhibited.

That is, with the rotation of each motor described above, that rotation is transmitted by each endless belt to each pulley, and these pulleys are also rotated in the same direction at the same angle.

Here, with the one pulley to which the gear is not attached being fixed to the first rotating member via the first shaft, this first rotating member is rotated about the first rotation axis line.

On the other hand, the pulley to which one of the gears is attached is rotatably attached to the first shaft. Thus, the rotation of this pulley is not directly involved in the rotation of the first rotating member.

However, one of the gears is fastened to this pulley, and this one gear is rotated with the pulley.

And, with the one gear meshing with the other gear, this other gear is tried to be rotated about the second rotation axis line.

Here, as described above, with the first rotating member rotated by the pulley to which the one gear is not attached, the other gear is also moved about the first rotation axis line.

That is, the other gear moves integrally with the rotation of the one gear, and this other gear is moved without rotation.

Therefore, the second rotating member to which the other gear is fastened is rotated about the first rotation axis line, in a state in which rotation about the second rotation axis line is inhibited.

Also, with the pulley to which the one gear is attached being rotated in a state in which the pulley to which the one gear is not attached is stopped, the second rotating member can be rotated about the second rotation axis line in a state in which rotation of the first rotating member is constrained.

That is, when the pulley to which the one gear is not attached is retained in a stop state, the first rotating member fastened to this pulley is retained in a state in which rotation about the first rotation axis line is constrained.

In this state, also for the other gear together with the first rotating member, movement about the first rotation axis line is constrained.

Here, when the pulley to which the one gear is attached is rotated, the one gear also rotates, and causes the other meshed gear to rotate. This causes the second rotating member to which the other gear is fastened to be rotated about the second rotation axis line.

Furthermore, with the pulley to which the one gear is not fastened being rotated in a state in which rotation of the pulley to which the one gear is fastened is constrained, the second rotating member can be caused to simultaneously perform rotation about the first rotation axis line and rotation about the second rotation axis line.

That is, the pulley to which the one gear is fastened is set to be rotatable with respect to the first rotating member. In this state, when the pulley to which the one gear is not fastened is rotated, together with that rotation, the first rotating member is rotated about the first rotation axis line.

As described above, when the first rotating member is rotated about the first rotation axis line, together with that, the second rotating member is rotated with the other gear about the first rotation axis line.

Here, as described above, with the one gear stopping, the other gear meshing with this one gear is rotated, and the second rotating member to which this other gear is fastened is rotated about the second rotation axis line.

In this manner, by controlling the rotation of the paired pulleys, the second rotating member can be rotated about two axes, the first rotation axis line and the second rotation axis line.

Therefore, the attitude of the equipment attached to the second rotating member can be three-dimensionally adjusted.

Furthermore, with the motor which rotates each of the pulley is installed separately from the movable unit, the weight of the movable unit is reduced. Accordingly, the ability required for the motors can be reduced, and responsivity of the movable unit can be improved.

And, the support unit can be provided with a motor which rotates the movable unit and the drive unit about an axis line passing through a point of intersection of the first rotation axis line and the second rotation axis line.

With this structure, the number of rotation axis lines of the movable unit can be increased to enlarge a range of attitude adjustment of this movable unit.

And, the attitude control device of the present invention can be used with a movable body.

As the movable body, any object such as a flying object, a land traveling object, or water traveling object is applicable.

In this manner, even if the device is mounted on a movable body significantly changing in attitude, the above-described high responsivity allows highly-accurate attitude control.

Advantageous Effects of Invention

According to the attitude control device of the present invention, by installing a heavy-weight object such as a motor separately from the movable unit, the weight of the movable unit can be reduced, and responsivity of attitude control can be enhanced.

BRIEF DESCRIPTION OF DRAWINGS

FIG. 1 is a front view depicting one embodiment of the present invention.

FIG. 2 is a side view depicting one embodiment of the present invention.

FIG. 3 is a longitudinal sectional view of a movable unit, depicting one embodiment of the present invention.

FIG. 4 is an exploded perspective view of the movable unit, depicting one embodiment of the present invention.

FIG. 5 is an enlarged longitudinal sectional view of the movable unit for describing operation, depicting one embodiment of the present invention.

FIG. 6 is an enlarged longitudinal sectional view of the movable unit for describing operation, depicting one embodiment of the present invention.

FIG. 7 is an enlarged longitudinal sectional view of the movable unit for describing operation, depicting one embodiment of the present invention.

FIG. 8 is a front view depicting a state of being mounted on a flying object, depicting one embodiment of the present invention.

FIG. 9 is a front view depicting an attitude control state when mounted on the flying object, depicting one embodiment of the present invention.

FIG. 10 is a front view depicting an attitude control state when mounted on the flying object, depicting one embodiment of the present invention.

FIG. 11 is a front view depicting a state of being mounted on a land traveling object, depicting one embodiment of the present invention.

FIG. 12 is front view depicting an attitude control state when mounted on the land traveling object, depicting one embodiment of the present invention.

DESCRIPTION OF EMBODIMENT

In the following, one embodiment of the present invention is described with reference to the drawings.

In FIG. 1, a reference character 1 denotes an attitude control device according to the present embodiment.

This attitude control device 1 includes a support unit A, a movable unit B provided to be connected to this support unit A and to which equipment 2 is attached, and a drive unit C interposed between these support unit A and movable unit B.

The support unit A is configured of a base body 3, a first motor 4 such as a servo motor attached onto this base body 3, a support shaft 5 integrally provided to be connected to a drive shaft of this first motor 4, and paired first brackets 6, as depicted in FIG. 2, attached to a tip part of this support shaft 5 with a space in a direction orthogonal to an axis line of this support shaft 5.

The movable unit B includes a first rotating member 7 rotatably disposed between the first brackets 6 provided to the support unit A and a second rotating member 8 rotatably attached to this first rotating member 7 and to which the equipment 2 is attached.

To each of the paired first brackets 6, a first shaft 9 along a direction orthogonal to the axis line of the support shaft 5 is coaxially and rotatably attached.

These first shafts 9 are made protrude between the first brackets 6 and fitting in the first rotating member 7 disposed inside to rotatably support this first rotating member 7, thereby configuring a first rotation axis line.

Also, one of the first shafts 9 is made, for example, by spline fitting to the first rotating member 7 so as to rotate integrally with this first rotating member 7, and the other of the first shafts 9 is made so as to be relatively rotatable with respect to the first rotating member 7.

Furthermore, to the respective first shafts 9, a first pulley 10 and a second pulley 11 which configure the drive unit C are integrally attached. To the second pulley 11 attached to the first shaft 9 made relatively rotatably fit in the first rotating member 7, a gear 12 is integrally attached.

The second rotating member 8 is provided with, as depicted in FIG. 1, paired second brackets 13 positioned so as to interpose the first rotating member 7 from a direction orthogonal to the paired first brackets 6.

Each of these second brackets 13 is provided with a second shaft 14 configuring a second rotation axis line orthogonal to the first rotation axis line and rotatably coupling the first rotating member 7 and the second rotating member 8 (refer to FIG. 1).

Also, to one of the second brackets 13, as depicted in detail in FIG. 3, a gear 15 disposed coaxially with the second shaft 14 and meshed with the gear 12 to configure the drive unit C is integrally attached.

And, the paired meshed gears 12 and 15 convert the rotation of the pulley 11 into rotation about the second shafts 14.

The drive unit C further includes, in a stay 16 provided to the support shaft 5, a second motor 17 and a third motor 18 in a pair attached across the support shaft 5, drive pulleys 19 and 20 integrally attached to drive shafts of these second and third motors 17 and 18 and, as depicted in FIG. 2, endless belts 21 and 22 wound between the drive pulleys 19 and 20 and the first and second pulleys 10 and 11 for motive power transmission.

Next, the operation of thus configured attitude control device 1 of the present embodiment is described.

First, with the second motor 17 and the third motor 18 driven to rotate in the same direction at the same angle, the first rotating member 7 can be rotated about the first shaft 5, in a state in which the rotation of the second rotating member 8 about the second shafts 14 is inhibited.

That is, with the rotation of the second motor 17 and the third motor 18 described above, that rotation is transmitted by each of the endless belts 21 and 22 to the first pulley 10 and the second pulley 11, and these pulleys 10 and 11 are also rotated in the same direction at the same angle.

Here, with the first pulley 10 fixed to the first rotating member 7 via the first shaft 9, this first rotating member 7 is rotated about the first shaft 9.

On the other hand, the second pulley 11 is rotatably attached to the first shaft 9. Thus, the rotation of this second pulley 11 is not directly involved in the rotation of the first rotating member 7.

However, the one gear 12 is fastened to this second pulley 11, and this one gear 12 is rotated with the second pulley 11.

And, with the one gear 12 meshing with the other gear 15, this other gear 15 is tried to be rotated about the second shaft 14.

Here, as described above, with the first rotating member 7 rotated by the first pulley 10, the other gear 15 is also moved about the first shafts 9.

That is, the other gear 15 moves integrally with the rotation of the one gear 12, and this other gear 15 is moved without rotating about the second shaft 14.

Therefore, the second rotating member 8 to which the other gear 15 is fastened is rotated about the first shafts 9, as depicted in FIG. 6, in a state in which rotation about the second shafts 14 is inhibited.

Also, with the second pulley 11 rotated in a state in which the first pulley 10 is stopped, the second rotating member 8 can be rotated about the second shafts 14 in a state in which rotation of the first rotating member 7 is constrained.

That is, when the first pulley 10 is retained in a stop state, the first rotating member 7 fastened to this first pulley 10 is retained in a state in which rotation about the first shafts 9 is constrained.

In this state, also for the other gear 15 together with the first rotating member 7, movement about the first shafts 9 is constrained.

Here, when the second pulley 11 is rotated, the one gear 12 also rotates, and the meshed other gear 15 is rotated. This rotates the second rotating member 8 to which the other gear 15 is fastened about the second shafts 14, as depicted in FIG. 5.

Furthermore, with the first pulley 10 rotated in a state in which rotation of the second pulley 11 is constrained, as depicted in FIG. 7, the second rotating member 8 can be caused to simultaneously perform rotation about the first shafts 9 and rotation about the second shafts 14.

That is, the second pulley 11 to which the one gear 12 is fastened is rotatable with respect to the first rotating member 7. In this state, when the first pulley 10 is rotated, the first rotating member 7 is rotated with that rotation about the first shafts 9.

As described above, when the first rotating member 7 is rotated about the first shaft 9, together with that, the second rotating member 8 is moved about the first shafts 9 together with the other gear 15.

Here, as described above, with the one gear 12 stopping, the other gear 15 meshing with this one gear 12 is rotated about the shafts 14, and the second rotating member 8 to which this other gear 15 is fastened is rotated about the second shafts 14.

In this manner, by controlling the rotation of the paired pulleys 10 and 11, the second rotating member 8 can be rotated about two axes, the first shafts 9 and the second shafts 14.

Therefore, the attitude of the equipment attached to the second rotating member can be three-dimensionally adjusted.

Furthermore, with the second motor 17 and the third motor 18 which activate the movable unit B installed separately from the movable unit B, the weight of the movable unit B is reduced. Accordingly, the ability required for the motors 17 and 18 can be reduced, and responsivity of the motion of the movable unit B can be improved.

And, with the support unit A provided with the first motor 4 which rotates the movable unit B and the drive unit C about an axis line passing through a point of intersection of the first rotation axis line and the second rotation axis line, the number of rotation axis lines of the movable unit B can be increased to enlarge a range of attitude adjustment of this movable unit B.

And, the attitude control device 1 of the present embodiment can be used as being mounted on a flying object 23 as depicted in FIG. 8.

In this case, even when the flying attitude of the flying object 23 is changed, as depicted in FIG. 9 and FIG. 10, a change in attitude of the equipment 2 can be inhibited.

In a depicted example, an example is depicted in which the equipment 2 is retained in a horizontal state.

Also, the attitude control device 1 of the present embodiment can be used as being mounted on a land traveling object 24 as depicted in FIG. 11.

In this case, even if a change in attitude of the land traveling object 24 occurs due to a change in gradient of a traveling road surface, a change in attitude of the equipment can be inhibited as depicted in FIG. 12.

In a depicted example, an example is depicted in which the equipment 2 is retained in a horizontal state.

Note that various shapes, dimensions, and so forth of each component member depicted in the embodiment are merely examples and various changes can be made based on design requirements and so forth.

For example, the attitude control device of the present invention may be mounted on a water movable body such as a ship, or may be installed on a support structure to perform equipment attitude adjustment with respect to this support structure.

REFERENCE SIGNS LIST 1 attitude control device
2 equipment
3 base body
4 first motor
5 support shaft
6 first bracket
7 first rotating member
8 second rotating member
9 first shaft
10 first pulley
11 second pulley
12 gear
13 second bracket
14 second shaft
15 gear
16 stay
17 second motor
18 third motor
19 drive pulley
20 drive pulley
21 endless belt
22 endless belt
23 flying object
24 land traveling object
A support unit
B movable unit
C drive unit

The invention claimed is:

1. An attitude control device comprising a support unit, a movable unit provided to be connected to this support unit and to which equipment is attached, and a drive unit interposed between these support unit and movable unit, wherein the movable unit has a first rotating member rotatably attached to the support unit about a first rotation axis line and a second rotating member rotatably attached to this first rotating member about a second rotation axis line orthogonal to the first rotation axis line and to which the equipment is attached, the support unit is provided with paired first brackets positioned so as to sandwich the first rotating member, and these first brackets are each provided with a first shaft configuring the first rotation axis line and supporting the first rotating member, the second rotating member is provided with paired second brackets positioned so as to sandwich the first rotating member from a direction orthogonal to the paired first brackets, and these second brackets are each provided with a second shaft configuring the second rotation axis line and causing the first rotating member to rotatably support the second rotating member, the drive unit includes paired motors attached to the support unit and having a rotation axis line parallel to each of the first shafts, an endless belt wound between a pulley provided to each of the first shafts and each of the motors for motive power transmission, and paired gears respectively attached to the first shaft and the second shaft adjacent to each other as a set and converting rotation about the first rotation axis line into rotation about the second rotation axis line, and one of the gears is fastened to the pulley and is rotatably attached to the first rotating member, the other gear is fastened to the second bracket of the second rotating member and, furthermore, to the first shaft to which the gear is not attached, the pulley provided to this first shaft and the first rotating member are fastened.

2. The attitude control device according to claim 1, wherein the support unit is provided with a motor which rotate the movable unit and the drive unit about an axis line passing through a point of intersection of the first rotation axis line and the second rotation axis line.

3. The attitude control device according to claim 1, wherein the support unit, the movable unit, and the drive unit are mounted on a movable body.

4. The attitude control device according to claim 3, wherein the movable body is a flying object.

5. The attitude control device according to claim 3, wherein the movable body is a land traveling object.

6. The attitude control device according to claim 3, wherein the movable body is a water traveling object.

7. The attitude control device according to claim 2, wherein the support unit, the movable unit, and the drive unit are mounted on a movable body.

* * * * *